United States Patent
Argillier et al.

(10) Patent No.: US 9,719,335 B2
(45) Date of Patent: Aug. 1, 2017

(54) OPTIMIZED CHEMICAL ENHANCED RECOVERY METHOD

(75) Inventors: Jean-Francois Argillier, Rueil-Malmaison (FR); Isabelle Henaut, Rueil-Malmaison (FR); Adeline Dupas, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 9 days.

(21) Appl. No.: 13/808,304

(22) PCT Filed: Jul. 6, 2011

(86) PCT No.: PCT/FR2011/000397
§ 371 (c)(1),
(2), (4) Date: Apr. 5, 2013

(87) PCT Pub. No.: WO2012/004474
PCT Pub. Date: Jan. 12, 2012

(65) Prior Publication Data
US 2013/0213650 A1    Aug. 22, 2013

(30) Foreign Application Priority Data
Jul. 6, 2010    (FR) .................................... 10 02828

(51) Int. Cl.
| | |
|---|---|
| *E21B 43/16* | (2006.01) |
| *C09K 8/588* | (2006.01) |
| *E21B 37/06* | (2006.01) |
| *E21B 43/20* | (2006.01) |
| *E21B 43/25* | (2006.01) |

(52) U.S. Cl.
CPC .............. *E21B 43/16* (2013.01); *C09K 8/588* (2013.01); *E21B 37/06* (2013.01); *E21B 43/20* (2013.01); *E21B 43/25* (2013.01)

(58) Field of Classification Search
CPC  C09K 8/60; C09K 8/588; E21B 37/06; E21B 43/20; Y10S 507/929
USPC ................................. 166/270, 275, 307, 400
See application file for complete search history.

(56) References Cited

U.S. PATENT DOCUMENTS

| | | | | |
|---|---|---|---|---|
| 3,372,748 | A | * | 3/1968 | Cook ........................... 166/246 |
| 3,556,221 | A | * | 1/1971 | Haws et al. ................ 166/305.1 |
| 3,679,000 | A | * | 7/1972 | Kaufman ................ C09K 8/588 |
| | | | | 166/275 |

(Continued)

FOREIGN PATENT DOCUMENTS

WO    WO 2004/042187 A1    5/2004

OTHER PUBLICATIONS

Oil and Gas Production Handbook, Devoid, Havard. (May 2009) p. 15.*

*Primary Examiner* — Angela M DiTrani
*Assistant Examiner* — Avi Skaist
(74) *Attorney, Agent, or Firm* — Fitch, Even, Tabin & Flannery, LLP

(57) ABSTRACT

An enhanced recovery method that optimizes the stages of pumping, transport and surface treatment of the production effluent, during which a sweep fluid having at least one polymer so as to displace hydrocarbons towards a production well is injected into a reservoir, the resulting production effluent having hydrocarbons is collected through the production well, and a degradation agent for a polymer within the sweep fluid is injected into the effluent.

16 Claims, 3 Drawing Sheets

(56) References Cited

U.S. PATENT DOCUMENTS

| | | | |
|---|---|---|---|
| 4,014,801 A * | 3/1977 | Fullinwider | C10G 33/04 |
| | | | 166/305.1 |
| 4,163,476 A | 8/1979 | Tate | |
| 4,433,727 A * | 2/1984 | Argabright | C09K 8/588 |
| | | | 166/252.1 |
| 4,464,268 A * | 8/1984 | Schievelbein | 507/254 |
| 4,871,022 A * | 10/1989 | McGlathery | C09K 8/5086 |
| | | | 166/270.1 |
| 4,899,818 A * | 2/1990 | Jennings et al. | 166/270 |
| 5,038,864 A * | 8/1991 | Dunleavy et al. | 166/300 |
| 5,238,065 A * | 8/1993 | Mondshine | C09K 8/52 |
| | | | 166/300 |
| 5,268,112 A | 12/1993 | Hutchins et al. | |
| 6,138,760 A * | 10/2000 | Lopez | C09K 8/52 |
| | | | 166/280.1 |
| 6,488,091 B1 * | 12/2002 | Weaver | C09K 8/62 |
| | | | 166/300 |
| 2003/0236171 A1 * | 12/2003 | Nguyen | C09K 8/08 |
| | | | 507/100 |
| 2005/0061504 A1 | 3/2005 | Frost et al. | |
| 2008/0305971 A1 * | 12/2008 | Li et al. | 507/90 |

\* cited by examiner

OPTIMIZED CHEMICAL ENHANCED RECOVERY METHOD

FIELD OF THE INVENTION

The present invention relates to an optimized enhanced recovery method using a sweep fluid comprising at least one polymer.

BACKGROUND OF THE INVENTION

Since the world energy crisis, it has become essential to be able to recover a maximum amount of hydrocarbons contained in underground formations. The most commonly used method consists in injecting, via an injection well, an aqueous fluid (generally water or brine). This fluid sweeps the underground formation so as to drive the hydrocarbons out of the pores of the rock where it is absorbed. Production wells allow a production effluent comprising a mixture of water, salts and hydrocarbons to be recovered. This method is known as enhanced oil recovery (EOR) method.

There are several enhanced oil recovery methods. When compounds are added to the fluid injected, which is also referred to as sweep fluid, the method is referred to as tertiary enhanced recovery. These chemical compounds are polymers, surfactants, alkaline compounds, or mixtures of such compounds. In relation to simple water or brine injection, the interest of the presence of a polymer is to increase the viscosity of the sweep fluid and therefore to improve the mobility ratio between the fluid injected and the hydrocarbons in place in the underground formation. The hydrocarbon recovery efficiency is increased as a result of a higher formation sweep efficiency. The polymers used in this method are generally polymers of high molecular mass used for their viscosifying properties.

Using polymers in tertiary enhanced recovery however poses some practical problems. In the production wells, an aqueous fluid/hydrocarbon mixture is recovered in form of an emulsion whose water/hydrocarbon ratio evolves as a function of the production time. After a certain operation time (referred to as polymer breakthrough), polymer mixed with the aqueous phase of the sweep fluid is recovered upon pumping in the production tubings. The polymer concentration in the production effluent is variable but however sufficient to disturb pumping thereof. Indeed, the polymer has the property of increasing the viscosity of the sweep fluid, it therefore also increases the viscosity and the viscoelastic properties of the production effluent. The higher the viscosity of the production effluent, the more the pressure drops and the pumping energy consumption increase during reservoir production. The viscosity increase of the production fluid can also lead to production tubing clogging, which requires to temporarily stop the development of the underground formation. The higher the viscous properties of the production effluent, the more it creates pumping difficulties, as well as problems with the other equipments necessary for surface treatment of the fluid.

The presence of polymer in the production fluid makes separation of the various fluids (oil/gas/water) and secondary treatment of the water more difficult. When the production effluent reaches the surface, it is treated in a surface unit. This unit allows the various fluids, gas, oil and water, to be separated. After this surface treatment, the hydrocarbons are ready to be refined. The water is treated and depolluted in order to minimize the discharge of toxic products into the environment. The presence of polymer in the fluids produced, as reported in publication SPE 65390 (2001) "Emulsification and stabilization of ASP Flooding Produced liquid" by Wu Di et al., can cause stabilization of the emulsions in the fluids produced and pose problems as regards the surface treatment methods, in particular the water/oil/gas separation and the secondary water treatment methods.

The goal of the present invention is to provide an enhanced recovery method that optimizes the stages of pumping, transport and surface treatment of the production effluent.

SUMMARY OF THE INVENTION

The invention thus relates to an optimized enhanced recovery method for hydrocarbons contained in a geological reservoir, comprising:
  injecting into said reservoir a sweep fluid comprising at least one polymer so as to displace said hydrocarbons towards at least one production well,
  collecting a production effluent comprising the hydrocarbons through the production well,
  injecting into said effluent at least one degradation agent for said polymer.

Injection of the degradation agent can be performed at the bottom of the production well and/or at the top of the production well and/or prior to the primary hydrocarbon/water separation stage.

More particularly, the degradation agent can be injected in aqueous solution.

According to the invention, the degradation agent can be an oxidizing compound.

Advantageously, said degradation agent can be selected from the group consisting of: ferrous ions $Fe^{2+}$, hydrogen peroxide, sodium hypochlorite, ammonium persulfate, sodium persulfate, potassium persulfate and mixtures thereof.

According to the invention, the degradation agent concentration in the aqueous solution can range between 0.1 and 5000 ppm, preferably between 1 and 2000 ppm.

According to the invention, said polymer can be selected from the group consisting of: natural polymers, synthetic polymers; the molar mass of said polymer ranges between $0.5*10^6$ and $30*10^6$ g/mol.

Advantageously, said polymer can be selected from the group consisting of: acrylamide-based polymers or copolymers, partially hydrolyzed polyacrylamides, acrylamide copolymers with sulfonated monomers, acrylamide and polyvinylpyrrolidone copolymers, acrylamide and acrylic copolymers, guar gums, cellulose and cellulose derivatives, starch, xanthan gums, galactomannanes and mixtures thereof.

Furthermore, an anticorrosion agent in admixture with said degradation agent can be injected into said effluent.

BRIEF DESCRIPTION OF THE FIGURE

Other features and advantages of the present invention will be clear from reading the description hereafter of an embodiment of the method given by way of non-limitative example, illustrated by FIG. 1 diagrammatically showing a reservoir developed through enhanced recovery.

DETAILED DESCRIPTION

What is referred to as "hydrocarbon(s)" in the sense of the present invention are oil-bearing products such as petroleum or crude oil, extra-heavy petroleum or oil, asphaltenic sands, oil shales and gases present in an underground formation.

What is referred to as "production effluent" or "production fluid" in the sense of the present invention is the fluid recovered in a production well after sweep of an underground formation. This fluid comprises, in variable proportions, the hydrocarbons extracted from the pores of the underground formation and sweep fluid components such as polymers, surfactants, alkaline compounds, water or brine.

Figure 1:
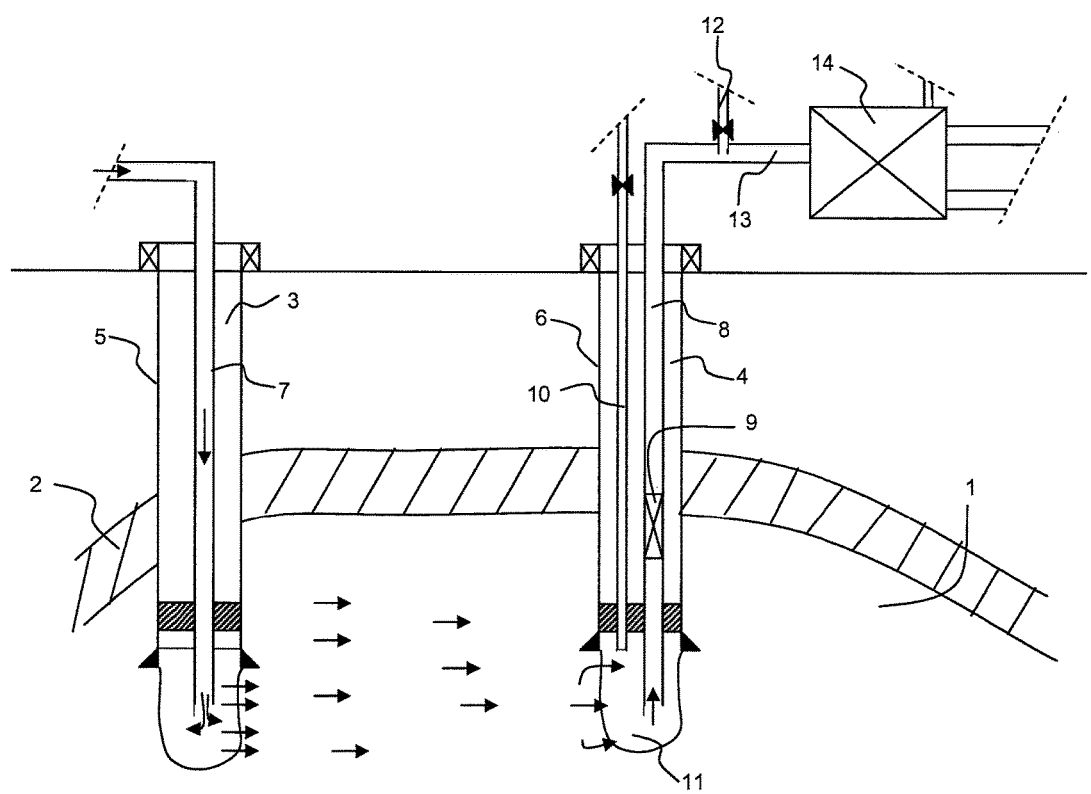

FIG. 1 shows an underground geological reservoir 1 with an overlying cap rock 2. A well 3 is drilled through this reservoir and used as injection well 3. A well 4 also drilled through the reservoir, at a predetermined distance from injection well 3, is used as production well 4. Both wells are conventionally cased by a pipe (5, 6) cemented in the formation. A string of injection pipes 7 allows injection, into the reservoir rock, of the sweep fluid. A string of production tubings 8 allows extraction of the production effluent at the surface. Production string 8 can comprise pumping means 9. These means can be an electric bottomhole pump, or any other conventional pumping system.

An injection line 10 is set in the production well annulus so as to allow injection, into collection zone 11 at the well bottom, of a degradation agent for the polymer(s) used to increase the sweep fluid viscosity.

In a variant, a surface injection line 12 is connected to surface flowline 13 in continuation of production string 8. It is also possible to inject a degradation agent through this line, instead of a bottomhole injection, or as a supplement thereto.

Flowline 13 carries the production effluent to a treatment facility 14 that can comprise dilution, separation and/or filtration means.

Injection of the degradation agent is controlled from the surface and it is performed according to the sweep fluid breakthrough in the production well. In fact, injection of the degradation agent is started only when viscosifying polymer proportions are detected in the production effluent, or when the negative effects of the presence of polymer in the production effluent are established.

The agent is selected for its oxidizing power that allows the polymer to be broken down into fragments of low molecular masses, allowing a significant viscosity decrease. This fragmentation is achieved through radical or ionic type chain reactions whose progress leads to the progressive depolymerization of the polymer macromolecule. Such reactions can be obtained by any degradation agent of suitable oxidizing power in relation to the polymer to be degraded. The decrease in the polymer mass leads to a decrease in the viscosity of the aqueous phase of the production effluent containing the hydrocarbons extracted. This fluid is then more readily and more rapidly pumped in the production tubings. Furthermore, the polymer mass decrease allows to more readily destabilize the emulsion between the aqueous phase of the production fluid and the hydrocarbons extracted, and to treat the water more readily after primary separation with the oil and the gas. The surface treating methods, in particular as regards water/hydrocarbon/gas separation and secondary water treatments, are thus simplified.

The present invention is preferably intended for production fluids obtained by means of an enhanced oil recovery method wherein the sweep fluid comprises at least one polymer or a mixture of polymers. Injection of the solution comprising the degradation agent or the mixture of degradation agents can be performed in situ at the bottom of the production well and/or at the top of the production well and/or in the production lines. The primary hydrocarbon/water separation stage can be carried out at the surface or on the sea bottom with a subsea separator system. Preferably, injection of the degradation agent is carried out prior to the primary separation stage. More preferably, the degradation agent injection stage is carried out before the subsea separator system. Preferably, injection of the degradation agent or of the mixture of degradation agents can be performed in the production fluid that flows into the plant used for enhanced oil recovery.

The hydrosoluble polymer(s) present in the production fluid can be of synthetic or natural origin. Examples of polymers of synthetic origin are acrylamide-based polymers or copolymers, such as the partially hydrolyzed polyacrylamides referred to as HPAMs, which are salt (sodium type) acrylamide and acrylate copolymers, acrylamide copolymers with sulfonated monomers such as AMPS (2-acrylamido-2methylpropane sulfonate) or acrylamide copolymers with PVP (poly vinyl pyrrolidone) type monomers, acrylamide and acrylic copolymers. The polymers of natural origin can be selected from the group consisting of guar gums, cellulose and cellulose derivatives, such as carboxymethylcellulose, hydroxyethylcellulose and carboxyethylcellulose, starch, xanthan gums, galactomannanes or mixtures thereof. The polymers can be functionalized by sulfonate, carboxylate, amine, imine, ammonium, carboxamide, imide, hydroxyl, acetyl groups. More preferably, the polymer is a hydrosoluble acrylamide-based polymer. The molecular mass of the polymer used is generally above 500,000 and preferably above 10,000,000 g/mol. Preferably, the molecular mass of the polymer ranges between 500,000 and 30,000,000 g/mol. The polymer concentration in the aqueous solution is selected so as to have a good mobility ratio according to the oil and to the reservoir conditions. It usually ranges between 200 and 5000 ppm (parts per million) by weight, preferably between 500 and 3000 ppm by weight of the aqueous phase.

What is referred to as "degradation agent" in the sense of the present invention is any chemical compound allowing to reduce the molecular mass of the polymer. Preferably, the degradation agent is an oxidizing compound with the property of fragmenting the polymer chains. The degradation agent or the mixture of degradation agents can be selected from the group consisting of ferrous ions $Fe^{2+}$, hydrogen peroxide, sodium hypochlorite, ammonium persulfate, sodium persulfate, potassium persulfate. The degradation agent concentration in the aqueous solution can be optimized according to the quality of the fluids obtained after sweeping. It depends on the polymer concentration, on the molecular mass of the polymer(s) used, on the sweep fluid and/or production well salinity conditions. This concentration is optimized in order to obtain facilitated hydrocarbon separation conditions. Preferably, the degradation agent concentration ranges between 0.1 and 5000 ppm by weight of the aqueous phase.

An anticorrosion agent can be injected in admixture with the polymer degradation agent. Anticorrosion agents are well known to the person skilled in the art, who knows how to adjust their concentration depending on the production conditions.

The present invention is intended for all the enhanced oil recovery methods that comprise a polymer injection stage, such as the methods combining, in addition to the injection of polymers, injection of a surfactant or of alkaline compounds (methods referred to as SP (Surfactant Polymer), AP (Alkaline Polymer) and ASP (Alkaline, Surfactant, Polymer)).

EXAMPLES

These examples were carried out by introducing the degradation agent to be tested into an aqueous solution or an aqueous fluid/hydrocarbon mixture containing a polymer of natural (xanthan) or synthetic (HPAM) origin, at concentrations corresponding to those commonly used for enhanced oil recovery. The solution is subjected to mechanical stirring at 3 rpm with a bar magnet throughout the experiment. Samples are taken at different times (0, 1 h 30, 2 h 30, 3 h 30, 5 h and 24 h) in order to measure the viscosity of the solution and to monitor the degradation of the polymer. The viscosity is measured at 20° C. with a Low Shear Contraves LS30. In each example, the viscosity is given for several shear rates (1, 10 and 100 $s^{-1}$).

Under certain experimental conditions, synthetic sea water is used. Its composition is given in the table below:

| Salt | Concentration in (g/L) |
| --- | --- |
| NaCl | 24.79 |
| $CaCl_2, 2H_2O$ | 1.6 |
| $MgCl_2, 6H^2O$ | 11.79 |
| KCl | 0.8 |

It can be noted that, in the examples given below, the polymer viscosity measured after 24 h without addition of a degradation agent has been measured. It has not decreased significantly.

Example 1: Degradation of HPAM in an Aqueous Solution 1a) by $FeCl_2$:

The viscosity measurements are performed for a synthetic sea water solution comprising 1000 ppm HPAM and 10 ppm $FeCl_2$. The results are given in the table hereafter:

| Viscosity | Shear rate ($s^{-1}$) | | |
| --- | --- | --- | --- |
| (mPa · s) | 1 | 10 | 100 |
| η (t = 0 h) | 8.34 | 7.02 | 4.90 |
| η (t = 1 h 30) | 3.87 | 3.91 | 3.37 |
| η (t = 2 h 30) | 3.20 | 3.36 | 3.13 |
| η (t = 3 h 30) | 2.83 | 2.97 | 2.82 |
| η (t = 5 h) | 2.61 | 2.68 | 2.60 |
| η (t = 24 h) | 1.50 | 1.34 | 1.37 |

This example shows a high and rather fast degradation of the polymer solution since more than 50% of the viscosity (measured at 1 $s^{-1}$) has been lost after 1 h 30.

1b) by NaClO:

The viscosity measurements are performed for a synthetic sea water solution comprising 1000 ppm HPAM and 140 ppm NaClO. The results are given in the table below:

| Viscosity | Shear rate ($s^{-1}$) | | |
| --- | --- | --- | --- |
| (mPa · s) | 1 | 10 | 100 |
| η (t = 0 h) | 8.34 | 7.02 | 4.90 |
| η (t = 1 h 30) | 1.02 | 1.07 | 1.10 |
| η (t = 2 h 30) | 1.00 | 1.03 | 1.10 |

A very high and very fast degradation of the polymer solution is observed here since a viscosity close to 1 mPa·s (measured at 1 $s^{-1}$) is recovered after 1 h 30.

1c) by $H_2O_2$:

The viscosity measurements are performed for a synthetic sea water solution comprising 1000 ppm HPAM and 1600 ppm $H_2O_2$. The results are given in the table hereafter:

| Viscosity | Shear rate ($s^{-1}$) | | |
| --- | --- | --- | --- |
| (mPa · s) | 1 | 10 | 100 |
| η (t = 0 h) | 8.34 | 7.02 | 4.90 |
| η (t = 1 h 30) | 7.32 | 6.49 | 4.70 |
| η (t = 2 h 30) | 6.44 | 5.97 | 4.42 |
| η (t = 3 h 30) | 5.99 | 5.68 | 4.31 |
| η (t = 24 h) | 2.10 | 1.96 | 1.98 |

Under the conditions of this example, a slower polymer degradation is noted, after 3 h 30, about 28% of the viscosity at 1 $s^{-1}$ is lost.

Example 2: Degradation of HPAM in a Water/Oil Mixture 2a) by $FeCl_2$:

The viscosity measurements are performed for a production water solution containing 200 ppm Venezuelan South American crude and in which 1000 ppm HPAM and 10 ppm $FeCl_2$ are dissolved. The results are given in the table below.

| Viscosity | Shear rate ($s^{-1}$) | | |
| --- | --- | --- | --- |
| (mPa · s) | 1 | 10 | 100 |
| η (t = 0 h) | 37.08 | 18.90 | 9.83 |
| η (t = 1 h 30) | 30.80 | 16.50 | 8.65 |
| η (t = 2 h 30) | 30.80 | 16.63 | 8.59 |
| η (t = 3 h 30) | 29.63 | 16.45 | 8.59 |
| η (t = 5 h) | 30.18 | 16.39 | 8.39 |
| η (t = 24 h) | 27.97 | 15.92 | 8.12 |

The viscosity measurements are performed for a production water solution containing 200 ppm crude and in which 1000 ppm HPAM and 100 ppm $FeCl_2$ are dissolved. The results are given in the table hereafter.

| Viscosity | Shear rate ($s^{-1}$) | | |
| --- | --- | --- | --- |
| (mPa · s) | 1 | 10 | 100 |
| η (t = 0 h) | 37.08 | 18.90 | 9.83 |
| η (t = 1 h 30) | 21.44 | 14.07 | 7.72 |
| η (t = 2 h 30) | 19.96 | 13.75 | 7.68 |
| η (t = 3 h 30) | 18.97 | 13.28 | 7.41 |
| η (t = 5 h) | 16.63 | 12.70 | 7.33 |
| η (t = 24 h) | 9.24 | 8.92 | 6.31 |

This example shows an effect of the $FeCl_2$ concentration on the polymer degradation kinetics, since at 1 $s^{-1}$ a viscosity of 19 mPa·s is obtained after 3 h 30 after addition of 100 ppm $FeCl_2$, whereas the viscosity has only been reduced to 30 mPa·s after addition of 10 ppm $FeCl_2$ after the same time.

2b) by NaClO:

The viscosity measurements are performed for a production water solution containing 200 ppm crude and in which 1000 ppm HPAM and 140 ppm NaClO are dissolved. The results are given in the table below.

| Viscosity | Shear rate ($s^{-1}$) | | |
| --- | --- | --- | --- |
| (mPa · s) | 1 | 10 | 100 |
| η (t = 0 h) | 37.08 | 18.90 | 9.83 |
| η (t = 1 h 30) | 1.26 | 1.28 | 1.30 |
| η (t = 2 h 30) | 1.40 | 1.33 | 1.26 |

-continued

| Viscosity | Shear rate (s$^{-1}$) | | |
|---|---|---|---|
| (mPa · s) | 1 | 10 | 100 |
| η (t = 3 h 30) | 0.98 | 1.14 | 1.16 |
| η (t = 24 h) | 0.97 | 1.08 | 1.10 |

It can be noted in this example that NaClO is very efficient for degrading the polymer, even in the presence of oil.

2c) by $H_2O_2$:

The viscosity measurements are performed for a production water solution containing 200 ppm crude and in which 1000 ppm HPAM and 1600 ppm $H_2O_2$ are dissolved. The results are given in the table below.

| Viscosity | Shear rate (s$^{-1}$) | | |
|---|---|---|---|
| (mPa · s) | 1 | 10 | 100 |
| η (t = 0 h) | 37.08 | 18.90 | 9.83 |
| η (t = 1 h 30) | 34.56 | 18.30 | 9.01 |
| η (t = 2 h 30) | 32.65 | 17.79 | 9.07 |
| η (t = 3 h 30) | 28.03 | 16.66 | 8.44 |
| η (t = 24 h) | 12.26 | 10.98 | 7.11 |

$H_2O_2$ is efficient for degrading the polymer and decreasing the viscosity of the fluid (74% of the initial viscosity at 1 s$^{-1}$ is recovered after 3 h 30).

Example 3: Degradation of Xanthan in an Aqueous Solution 3a) by $FeCl_2$:

The viscosity measurements are performed for a tap water solution in which 1000 ppm xanthan and 10 ppm $FeCl_2$ are dissolved. The results are given in the table below.

| Viscosity | Shear rate (s$^{-1}$) | | |
|---|---|---|---|
| (mPa · s) | 1 | 10 | 100 |
| η (t = 0 h) | 261.80 | 73.45 | 31.00 |
| η (t = 2 h 30) | 85.93 | 31.57 | 12.24 |
| η (t = 5 h) | 65.91 | 26.02 | 11.66 |

3b) by NaClO:

The viscosity measurements are performed for a tap water solution in which 1000 ppm xanthan and 100 ppm NaClO are dissolved. The results are given in the table hereafter.

| Viscosity | Shear rate (s$^{-1}$) | | |
|---|---|---|---|
| (mPa · s) | 1 | 10 | 100 |
| η (t = 0 h) | 261.80 | 73.45 | 31.00 |
| η (t = 1 h 30) | 16.20 | 12.72 | 6.98 |
| η (t = 2 h 30) | 3.80 | 3.72 | 3.10 |
| η (t = 5 h) | 2.30 | 2.27 | 2.22 |

3c) by $H_2O_2$:

The viscosity measurements are performed for a tap water solution in which 1000 ppm xanthan and 1600 ppm $H_2O_2$ are dissolved. The results are given in the table below.

| Viscosity | Shear rate (s$^{-1}$) | | |
|---|---|---|---|
| (mPa · s) | 1 | 10 | 100 |
| η (t = 0 h) | 261.80 | 73.45 | 31.00 |
| η (t = 1 h 30) | 69.91 | 28.67 | 11.90 |
| η (t = 2 h 30) | 32.71 | 17.83 | 8.93 |
| η (t = 5 h) | 14.78 | 12.22 | 6.90 |

This example shows that the degradation of natural polymers such as xanthan can also be obtained using oxidants.

Conclusion

Examples 1, 2 and 3 all confirm that the addition of a degradation agent at a concentration ranging for example between 1 and 5000 ppm allows to rapidly degrade a polymer used in enhanced oil recovery methods.

It has to be emphasized that tests were carried out on a polyacrylamide introduced in a production water containing emulsified and dissolved hydrocarbons, and that their presence did not significantly hinder the degrading action of the additive selected.

The goal of Examples 4 and 5 is to show the influence of the presence of polymers on the viscosity and the water-oil separation of production fluids. Polymer introduction can indeed lead to a viscosity increase, together with a stabilization of the water-hydrocarbon mixture. The tests also show how additives can greatly reduce this influence by degrading the polymer. Two series of experiments were conducted, representing respectively the conditions of sweep by a fluid containing a polymer (polymer flooding) and the conditions of the method (SP method) involving not only the polymer, but also surfactants.

Example 4

The first series of tests representative of polymer flooding was carried out with production fluids prepared from a mother emulsion O/W=70/30 in volume ratio. This mother emulsion was obtained by introducing 105 ml of a heavy crude (viscosity=350 Pas at 20° C., ° API=8.5) in 45 ml distilled water at pH 12 and containing 7.5 g/l NaCl. Dispersion of the crude in the water is achieved at 60° C. under UltraTurrax at 13,000 rpm for 5 minutes.

By dilution with aqueous phases containing suitable polyacrylamide HPAM (3630S) proportions, emulsions of volume ratio O/W 1/99 and 20/80 are prepared with 0 or 1000 ppm polymer. Their viscosities at 20° C. are measured with an imposed stress rheometer (Ta Instruments AR 2000) with a double concentric cylinder geometry. The values obtained are given in Table 1. They show that the presence of the polymer substantially increases the viscosity of the emulsions.

| Viscosity | Shear rate (s$^{-1}$) | | |
|---|---|---|---|
| (mPa · s) | 5 | 50 | 500 |
| O/W = 1/99 | 6.9 | 2.1 | 1.7 |
| O/W = 1/99 + 1000 ppm HPAM | 20.2 | 14.3 | 7.3 |
| O/W = 20/80 | 8.8 | 6.1 | 3.2 |
| O/W = 20/80 + 1000 ppm HPAM | 46.8 | 19 | 8.7 |

Three degradation agents (Fe2+, NaClO, $H_2O_2$) in the sense of the present invention were introduced in the polyacrylamide-containing emulsions. The samples are gently stirred with a bar magnet. The resulting viscosity is measured after about twelve hours (see Table 2). Samples are also put in test tubes so as to monitor the separation of the aqueous phase and of the crude. Photographs allow the separation obtained in the various samples after 6 hours to be compared.

| Viscosity | Shear rate (s$^{-1}$) | | |
|---|---|---|---|
| (mPa · s) | 5 | 50 | 500 |
| O/W = 1/99 + 1000 ppm HPAM | 20.2 | 14.3 | 7.3 |
| +Fe2+ | slipping | 11.2 | 7.5 |
| +NaClO | 3.6 | 1.7 | 1.3 |
| +H2O2 | 5.4 | 4.5 | 4 |
| O/W = 20/80 + 1000 ppm HPAM | 46.8 | 19 | 8.7 |
| +Fe2+ | heterogeneous | heterogeneous | heterogeneous |
| +NaClO | 6.7 | 5.6 | 3.4 |
| +H2O2 | heterogeneous | heterogeneous | heterogeneous |

Figure 2:
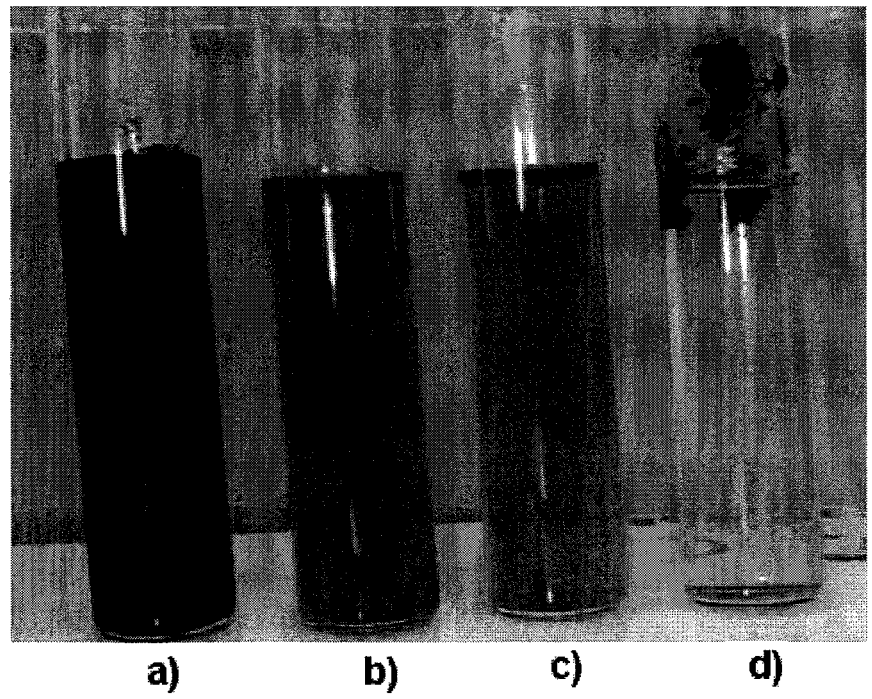
Figure 3:
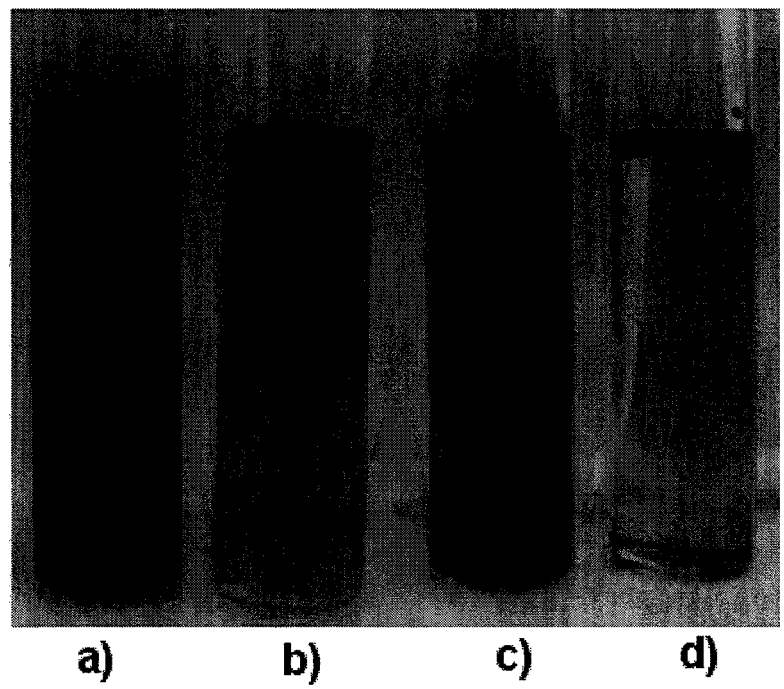

FIGS. 2 and 3 show the effect of the degradation agents (b): Fe2+, (c): NaClO and (d): H2O2 on the phase separation of the production fluids for emulsions (O/W=1/99 and O/W=20/80) representative of the enhanced recovery method with polymer flooding after 6 hours rest and 24 hours rest respectively.

In FIG. 2, tubes a), b), c), d) respectively correspond to the following compositions after 6 hours rest:
  a) heavy crude in water emulsion in the proportion 1/99+HPAM 1000 ppm
  b) heavy crude in water emulsion in the proportion 1/99+HPAM 1000 ppm+H$_2$O$_2$
  c) heavy crude in water emulsion in the proportion 1/99+HPAM 1000 ppm+Fe2+
  d) heavy crude in water emulsion in the proportion 1/99+HPAM 1000 ppm+NaClO.

In FIG. 3, tubes a), b), c), d) respectively correspond to the following compositions after 24 hours rest:
  a) heavy crude in water emulsion in the proportion 20/80+HPAM 1000 ppm
  b) heavy crude in water emulsion in the proportion 20/80+HPAM 1000 ppm+H$_2$O$_2$
  c) heavy crude in water emulsion in the proportion 20/80+HPAM 1000 ppm+Fe2+
  d) heavy crude in water emulsion in the proportion 20/80+HPAM 1000 ppm+NaClO.

These results clearly show that addition of the chemical additive of the present invention allows, by degrading the polymer, to decrease the viscosity of the fluid/production water and to promote phase separation.

Example 5

The second series of tests, representative of the SP (Surfactant+Polymer) method, was conducted with production fluids prepared from a mother emulsion O/W=70/30 in volume ratio. This mother emulsion was obtained by introducing 105 ml of a heavy crude (viscosity=at ° API=8.5) in 45 ml distilled water containing 7.5 g/l NaCl and 1% Triton X45 (surfactant). Dispersion of the crude in the water is achieved at 60° C. under UltraTurrax at 13,000 rpm for 5 minutes.

By dilution with aqueous phases containing suitable HPAM proportions, emulsions of volume ratio O/W 1/99 and 20/80 are prepared with 0 or 1000 ppm polymer. Their viscosities at 20° C. are measured with an imposed stress rheometer (Ta Instruments AR 2000) with a double concentric cylinder geometry. The values obtained are given in Table 3. They show that the presence of the polymer substantially increases the viscosity of the emulsions.

| Viscosity | Shear rate (s$^{-1}$) | | |
|---|---|---|---|
| (mPa · s) | 5 | 50 | 500 |
| O/W = 1/99 | 3.9 | 1.9 | 1.1 |
| O/W = 1/99 + 1000 ppm HPAM | 21 | 9.5 | 5 |
| O/W = 20/80 | 7 | 3.5 | 2 |
| O/W = 20/80 + 1000 ppm HPAM | 19.1 | 11.8 | 7.5 |

Three degradation agents (Fe2+, NaClO, H$_2$O$_2$) in the sense of the present invention were introduced in the polyacrylamide-containing emulsions. The samples are gently stirred for about twelve hours. The resulting viscosity is measured (see Table 4). Samples are also put in test tubes so as to monitor the separation of the aqueous phase and of the crude. Photographs allow the separation obtained in the various samples after 24 hours to be compared.

TABLE 4

Viscosity of the production fluids after treatment with a degradation agent

| Viscosity | Shear rate (s$^{-1}$) | | |
|---|---|---|---|
| (mPas) | 5 | 50 | 500 |
| O/W = 1/99 + 1000 ppm HPAM | 21 | 9.5 | 5 |
| +Fe2+ | 1 | 1.4 | 1.3 |
| +NaClO | 1.7 | 1.2 | 1.1 |
| +H2O2 | 1.7 | 1.2 | 1.1 |
| O/W = 20/80 + 1000 ppm HPAM | 19.1 | 11.8 | 7.5 |
| +Fe2+ | 3.8 | 3.5 | 3 |
| +NaClO | 10.6 | 8.2 | 6.1 |
| +H2O2 | 8 | 9 | 6.5 |

Figure 4:
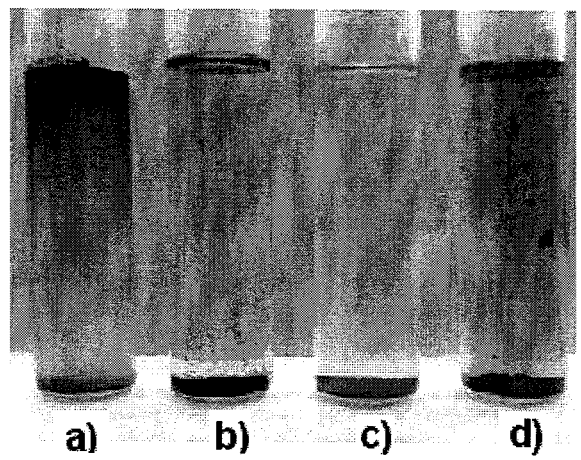
Figure 5:
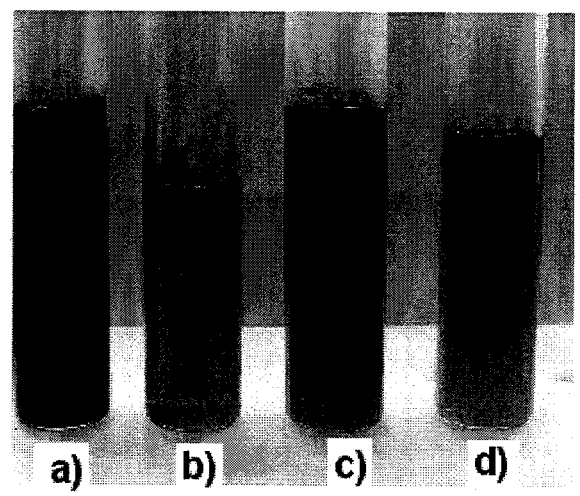

FIGS. 4 and 5 show the effect of the degradation agents Fe2+, NaClO and H2O2 on the phase separation of the production fluids for emulsions O/W=1/99 and O/W=20/80 representative of the enhanced recovery method with polymer flooding in the SP (Surfactant Polymer) method, in relation to production fluids containing no degradation agent, after 24 hours rest.

In FIG. 4, tubes a), b), c), d) respectively correspond to the following compositions after 24 hours rest:
  a) heavy crude in water emulsion in the proportion 1/99+HPAM 1000 ppm
  b) heavy crude in water emulsion in the proportion 1/99+HPAM 1000 ppm+H$_2$O$_2$.
  c) heavy crude in water emulsion in the proportion 1/99+HPAM 1000 ppm+NaClO
  d) heavy crude in water emulsion in the proportion 1/99+HPAM 1000 ppm+Fe2+.

In FIG. 5, tubes a), b), c), d) respectively correspond to the following compositions after 24 hours rest:
  a) heavy crude in water emulsion in the proportion 20/80+HPAM 1000 ppm
  b) heavy crude in water emulsion in the proportion 20/80+HPAM 1000 ppm+Fe2+.
  c) heavy crude in water emulsion in the proportion 20/80+HPAM 1000 ppm+NaClO d) heavy crude in water emulsion in the proportion 20/80+HPAM 1000 ppm+$H_2O_2$.

The results of Examples 4 and 5 clearly show that addition of the chemical additive of the present invention in the SP method allows, by degrading the polymer, to decrease the viscosity of the fluid/production water and to promote phase separation.

The invention claimed is:

1. An optimized enhanced recovery method for hydrocarbons contained in a geological reservoir, comprising:
    injecting into said reservoir a sweep fluid comprising at least one polymer in an aqueous solution at a concentration between 200 and 5000 ppm so as to displace said hydrocarbons towards at least one production well,
    collecting into the production well from the geological reservoir a production fluid, said production fluid comprising an aqueous phase and the hydrocarbons, and
    after collecting from the geological reservoir into the production well said production fluid and after detecting the presence of said at least one polymer in said production fluid in an amount ranging between 200 and 5000 ppm, injecting into said production fluid collected from the geological reservoir into the production well at least one degradation agent for said at least one polymer, said injection providing a concentration of the at least one degradation agent in an aqueous solution of 0.1-5.000 ppm, said injection being performed in situ at a location selected from the group consisting of the bottom of the production well, the top of the production well, and in the production lines.

2. A method as claimed in claim 1, wherein injection of the degradation agent is performed at the bottom of the production well.

3. A method as claimed in claim 1, wherein injection of the degradation agent is performed at the top of the production well.

4. A method as claimed in claim 1, wherein injection of the degradation agent is performed prior to a primary hydrocarbon and water separation.

5. A method as claimed in claim 1, wherein the degradation agent is an oxidizing compound.

6. A method as claimed in claim 1, wherein said degradation agent is selected from the group consisting of: ferrous ions $Fe^{2+}$, hydrogen peroxide, sodium hypochlorite, ammonium persulfate, sodium persulfate, potassium persulfate and mixtures thereof.

7. A method as claimed in claim 1, wherein said polymer is selected from the group consisting of: natural polymers and synthetic polymers; and wherein the molar mass of said polymer ranges between $0.5*10^6$ and $30*10^6$ g/mol.

8. A method as claimed in claim 7, wherein said polymer is selected from the group consisting of: acrylamide-based polymers or copolymers, partially hydrolyzed polyacrylamides, acrylamide copolymers with sulfonated monomers, acrylamide and polyvinylpyrrolidone copolymers, acrylamide and acrylic copolymers, guar gums, cellulose and cellulose derivatives, starch, xanthan gums, galactomannanes and mixtures thereof.

9. A method as claimed in claim 1, wherein an anticorrosion agent in admixture with said degradation agent is injected into said production fluid.

10. An optimized enhanced recovery method for hydrocarbons contained in an underground formation comprising a geological reservoir, the method comprising:
    injecting into said reservoir a sweep fluid comprising at least one polymer in an aqueous solution at a concentration between 200 and 5000 ppm so as to displace said hydrocarbons towards at least one production well, the production well comprising a void of the underground formation,
    collecting into the production well from the geological reservoir a production fluid, said production fluid comprising an aqueous phase and the hydrocarbons, and
    after collecting from the geological reservoir into the production well said production fluid and after detecting the presence of said at least one polymer in said production fluid in an amount ranging between 200 and 5000 ppm, injecting into said production fluid collected from the geological reservoir into the production well at least one degradation agent for said at least one polymer, said injection providing a concentration of the at least one degradation agent in an aqueous solution of 0.1-5.000 ppm, said injection being performed in situ at a location selected from the group consisting of the bottom of the production well, the top of the production well, and in the production lines.

11. A method as claimed in claim 1, wherein injection of the degradation agent is performed at the bottom of the production well.

12. A method as claimed in claim 1, wherein injection of the degradation agent is performed at the top of the production well.

13. A method as claimed in claim 1, wherein injection of the degradation agent is performed prior to a primary hydrocarbon and water separation.

14. A method as claimed in claim 1, wherein the degradation agent is an oxidizing compound.

15. A method as claimed in claim 1, wherein said degradation agent is selected from the group consisting of: ferrous ions $Fe^{2+}$, hydrogen peroxide, sodium hypochlorite, ammonium persulfate, sodium persulfate, potassium persulfate and mixtures thereof.

16. A method as claimed in claim 1, wherein said polymer is selected from the group consisting of: acrylamide-based polymers or copolymers, partially hydrolyzed polyacrylamides, acrylamide copolymers with sulfonated monomers, acrylamide and polyvinylpyrrolidone copolymers, acrylamide and acrylic copolymers, guar gums, cellulose and cellulose derivatives, starch, xanthan gums, galactomannanes and mixtures thereof; and wherein the molar mass of said polymer ranges between $0.5*10^6$ and $30*10^6$ g/mol.

* * * * *